(12) United States Patent
Javier et al.

(10) Patent No.: US 8,552,144 B2
(45) Date of Patent: Oct. 8, 2013

(54) BLOCK COPOLYMER WITH SIMULTANEOUS ELECTRIC AND IONIC CONDUCTION FOR USE IN LITHIUM ION BATTERIES

(75) Inventors: Anna Esmeralda K. Javier, Berkeley, CA (US); Nitash Pervez Balsara, El Cerrito, CA (US); Shrayesh Naran Patel, Berkeley, CA (US); Daniel T. Hallinan, Jr., Walnut Creek, CA (US)

(73) Assignee: The Regents of the University of California, Oakland, CA (US)

( * ) Notice: Subject to any disclaimer, the term of this patent is extended or adjusted under 35 U.S.C. 154(b) by 38 days.

(21) Appl. No.: 13/427,640

(22) Filed: Mar. 22, 2012

(65) Prior Publication Data

US 2012/0264880 A1    Oct. 18, 2012

Related U.S. Application Data

(60) Provisional application No. 61/466,366, filed on Mar. 22, 2011.

(51) Int. Cl.
*C08G 75/06* (2006.01)
*H01M 4/13* (2010.01)

(52) U.S. Cl.
USPC ........ 528/380; 525/187; 525/327.2; 525/535; 525/376; 429/217

(58) Field of Classification Search
USPC ........................................... 525/185
See application file for complete search history.

(56) References Cited

PUBLICATIONS

Gu et al (Synthesis of Poly(3-hexylthiophene)-b-poly(ethylene oxide) for Application to Photovoltaic Device, J. Photopoly Sci. and Tech., vol. 23 Issue 3, 2010, 405-406).*

* cited by examiner

*Primary Examiner* — David Buttner
*Assistant Examiner* — Christopher M Rodd
(74) *Attorney, Agent, or Firm* — Lawrence Berkely National Laboratory

(57) ABSTRACT

Redox reactions that occur at the electrodes of batteries require transport of both ions and electrons to the active centers. Reported is the synthesis of a block copolymer that exhibits simultaneous electronic and ionic conduction. A combination of Grignard metathesis polymerization and click reaction was used successively to synthesize the block copolymer containing regioregular poly(3-hexylthiophene) (P3HT) and poly(ethylene oxide) (PEO) segments. The P3HT-PEO/LiTFSI mixture was then used to make a lithium battery cathode with LiFePO$_4$ as the only other component. All-solid lithium batteries of the cathode described above, a solid electrolyte and a lithium foil as the anode showed capacities within experimental error of the theoretical capacity of the battery. The ability of P3HT-PEO to serve all of the transport and binding functions required in a lithium battery electrode is thus demonstrated.

2 Claims, 4 Drawing Sheets

BLOCK COPOLYMER WITH SIMULTANEOUS ELECTRIC AND IONIC CONDUCTION FOR USE IN LITHIUM ION BATTERIES

CROSS REFERENCE TO RELATED APPLICATIONS

This application claims priority to U.S. Provisional Application Ser. No. 61/466,366 filed Mar. 22, 2011 which application is incorporated herein by reference as if fully set forth in their entirety.

STATEMENT OF GOVERNMENTAL SUPPORT

The invention described and claimed herein was made in part utilizing funds supplied by the U.S. Department of Energy under Contract No. DE-AC02-05CH11231 between the U.S. Department of Energy and the Regents of the University of California for the management and operation of the Lawrence Berkeley National Laboratory. The government has certain rights in this invention.

BACKGROUND OF THE INVENTION

1. Field of the Invention

This invention relates generally to lithium ion batteries, and more specifically to novel block copolymers and method for their preparation, which copolymers exhibit simultaneous electronic and ionic conductivity, these copolymers having particular suitability for use with battery electrodes.

2. Brief Description of the Related Art

Increasing the energy density of rechargeable lithium batteries is a goal of considerable significance.(1, 2) While most of the efforts thus far have focused on the energy producing components of the battery,(1-7) i.e. the active components in the electrodes that participate in the energy-producing redox reactions, improvements in the non-energy-producing battery components are essential if these targets are to be met.

Current lithium-lot batteries contain several non-energy-producing components: (1) a liquid electrolyte to transport ions between the electrodes, (2) a polymeric separator to prevent contact between the electrodes, (3) an inactive polymer that binds the active particles in the electrodes, (4) an electronic conductor such as carbon to conduct electrons within the electrode, and (5) current collectors that deliver electrons to the external circuit. The non-energy producing components account for about 50% of the mass of a weight of a lithium battery.

Redox reactions that occur at the electrodes of batteries require transport of both ions and electrons to the active centers. This is challenging because the materials that are usually used to transport the two species are very different. Electrons are usually transported in crystalline solids such as metals or semiconductors while ions are transported in aqueous or organic salt solutions. In lithium batteries, electronic conduction is enabled by the introduction of carbon, white ion conduction is enabled by the creation of a porous structure that is backfilled with an organic electrolyte.(8)

Identifying processing steps that lead to the presence of active materials at the junctions of the electron- and ion-conducting phases is non-trivial. While it has been recognized that mixed conductors, i.e. materials that transport both ions and electrons to active sites would be useful, synthesizing materials capable of transporting both species and demonstrating success in executing redox reactions has not yet been accomplished.

SUMMARY OF THE INVENTION

By way of this invention a novel block copolymer and its method of synthesis are described, the copolymer a poly3-hexylthiophene-block-polyethylene oxide block copolymer (P3HT-PEO). Impedance spectroscopy shows that mixtures of P3HT-PEO and lithium salts transport both ions and electrons. Lithium batteries with non-porous cathodes comprising $LiFePO_4$ particles dispersed in the P3HT-PEO/salt mixture and lithium metal anodes show full utilization of the cathode capacity.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION

The block copolymers of this invention were synthesized by a combination of two methods: Grignard metathesis polymerization to synthesize an ethynyl-functionalized P3HT (Et-P3HT),(13, 14) which was then coupled to azide-terminated PEO by a click reaction,(15, 16) as shown in Scheme 1. The Et-P3HT was synthesized according to literature procedure,(14) while commercially available azide-terminated PEO (Polymer Source) was used without further purification. The two homopolymers were allowed to react in the presence of CuI and diisopropylethylamine (DIPEA) in THF for 72 h at 40° C.(16, 17) A sample aliquot was taken and analyzed by gel permeation chromatography (GPC) to verify formation of the block copolymer, as shown by an increase in molecular weight (MW) from the homopolymer Et-P3HI. After completion, the reaction mixture was quenched in methanol. Soxhlet extraction with methanol was done to remove the excess PEO homopolymer, CuI and DIPEA, all of which were soluble in methanol. Polymer characterizations are shown in Figures S1-2 in the supporting information (SI). The disappearance of the ethynyl proton peak in the $^1H$ NMR spectra at δ~3.57 ppm and the subsequent appearance of a peak at δ~7.86 ppm signify the formation of the triazole functional group.(16)

Scheme 1. Synthesis of P3HT-b-PEO block copolymer.

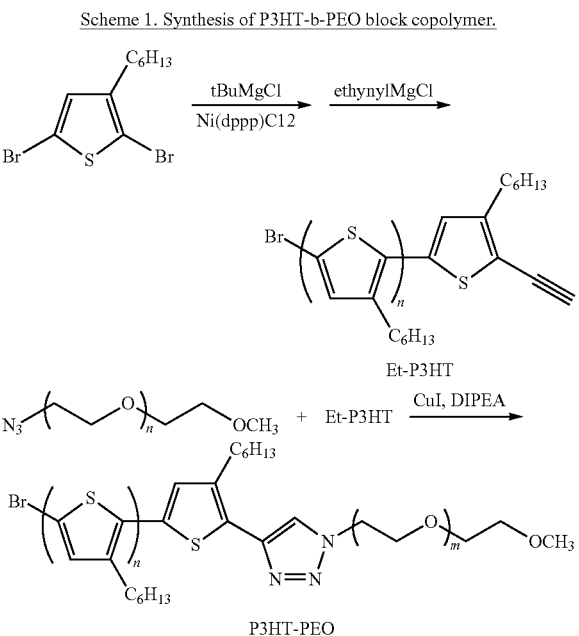

Figure 1:
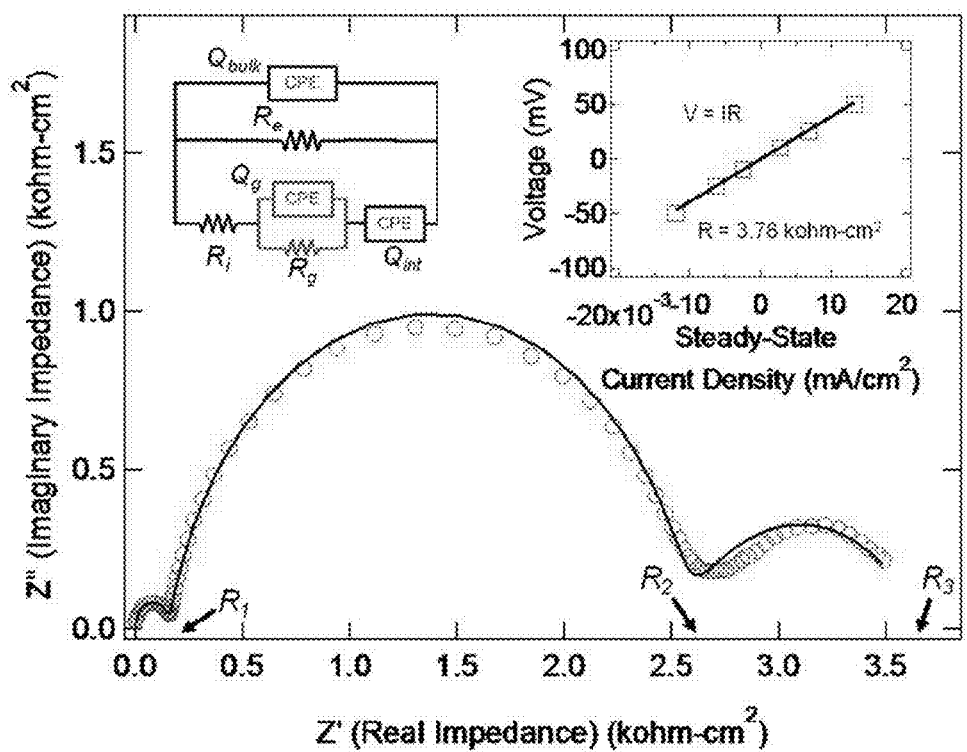
FIG. 1 is a Nyquist plot of P3HT-PEO at r=0.085 (T=90° C.).

Mixtures of P3HT-PEO and lithium bis(trifluoromethane sulfone)imide (LiTFSI) were made following procedures described in the SI. The molar ratio of lithium to ethylene oxide moieties, r, was fixed at 0.085 throughout this work. The results of impedance spectroscopy experiments performed by sandwiching the polymer between two nickel sheets are shown in FIG. 1. The Z" (imaginary impedance) versus Z' (real impedance) Nyquist plots are qualitatively different from those obtained from pure electronic and ionic conductors which exhibit a single Nyquist "semi-circle".(18-20) FIG. 1 is qualitatively different from previously published data of mixed polymer conductors.(11, 21, 22) The presence of three Nyquist semi-circles in FIG. 1 suggests the presence of multiple transport processes in our system. To aid in the interpretation of the impedance spectroscopy data, measured was the steady-state current obtained after applying small DC potentials across the system. These data, shown in the right inset of FIG. 1, are consistent with Ohm's law with a resistance of 3.78 k$\Omega$-cm$^2$. This value is approximately equal to the sum of the diameters of the three Nyquist semi-circles ($R_3$) shown in FIG. 1. Since nickel is a blocking electrode for ions, the DC experiments must reflect electronic resistance of the sample. The equivalent electronic circuit with resistances and constant phase elements (CPE), shown in the left inset in FIG. 1, is consistent with the data obtained from our sample.

A similar circuit (without the elements shown in blue in FIG. 1) was proposed for mixed conduction of an amorphous poly(p-phenylene) homopolymer,(23) but this circuit leads to two Nyquist semi-circles. A third set of elements (the portion shown in blue in FIG. 1) is necessary for fitting the experimental data. Similar equivalent circuits were used to explain the impedance data obtained from perovskite mixed conductors, wherein the circuit in blue was introduced to describe transport across grain boundaries.(18)

The curve in FIG. 1 represents the fitted Nyquist plots based on the proposed equivalent circuit, which leads to estimates of ionic and electronic conductivities of $(1.09 \pm 0.469) \times 10^{-4}$ S/cm and $(6.73 \pm 2.05) \times 10^{-6}$ S/cm, respectively (refer to SI for more information). The ionic resistance of our polymer, $R_i$, is simply given by $R_i = (R_3 R_1)/(R_3 - R_1)$. Our estimates of ionic and electronic conductivity are thus not sensitive to details of the fitting procedure or our lack of understanding of the origin of the three semi-circles. Normally one might expect electronic conduction to dominate the high frequency response of the material. It is thus tempting to interpret the high- and low-frequency semi-circles to represent electronic and ionic conductivities, respectively. This is far from the truth in the present case. The high-frequency semi-circle, in fact, has a similar frequency range as the impedance data obtained due to ion conduction in mixtures of polyethylene oxide) (PEO) and LiTFSI.(24) When an electronically conducting block is covalently linked to the ionic conductor, the low frequency-capacitive tail seen in pure ionic conductors (18) is replaced by the two right-most semi-circles.

In FIG. 1, the red circles correspond to experimental data and the black curve corresponds to a fit using the proposed equivalent circuit comprising resistors and CPE shown in the left inset. The right inset shows the Ohms law fit of DC potentials versus steady-state current where the slope corresponds to the electronic resistance. $R_1$, $R_2$, and $R_3$ correspond to the resistance values of each semicircle relative to the origin. Refer to SI for more details.

Figure 2:
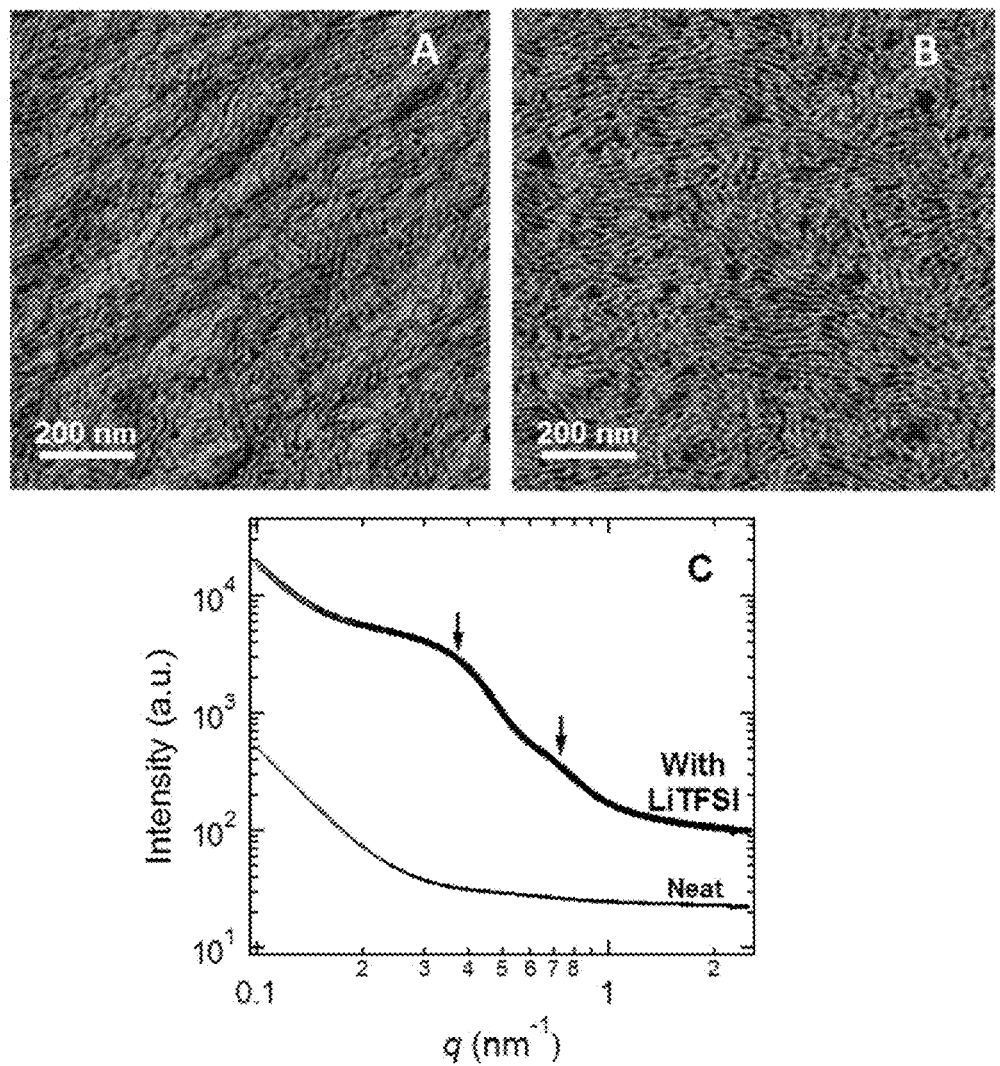
FIG. 2A is an AFM phase image of P3HT homopolymer; 2B an AFM phase image of P3HT-PEO.
FIG. 2C a plot of SAXS profiles of P3HT-PEO/LiTFSI mixture and neat P3HT-PEO at 100° C. The two arrows correspond to the broad shoulders seen at $q=0.37$ $mm^{-1}$ and $q=0.74$ $mm^{-1}$ for the P3HT-PEO/LiTFSI mixture.

In FIG. 2A and 2B, shown are tapping-mode AFM phase images of the P3HT homopolymer and the P3HT-PEO copolymer, respectively. In both images, we see the nanofibrillar morphology that is usually reported for the polymer. The nanofibril width is about 20 nm for both samples, which is consistent with literature values.(25) In FIG. 2A, the P3HT nanofibrils appear to have a compact arrangement with relatively little phase variation.

In contrast, we see more dark regions in between the nanofibrils in FIG. 2B. These dark regions may indicate the locations of the PEO block. These observations are consistent with previously published data on P3HT-containing block copolymers.(26)

In FIG. 2C we show small angle X-ray scattering (SAXS) profiles obtained from P3HT-PEO/LiTFSI mixtures where a broad shoulder is seen at a scattering vector, $q=0.37$ nm$^{-1}$ and a weak additional shoulder at about $q=0.74$ nm$^{-1}$. In contrast, SAXS profiles of pure P3HT-PEO contained no discernable features (FIG. 2C). The shoulder seen in FIG. 2C indicates the presence of a periodic structure with a length scale of ~17 nm. In previous studies on mixtures of LITFSI and PEO-containing block copolymers it was shown that the addition of the salt enhances microphase separation.(27) It is likely that this enhancement of microphase separation is responsible for the presence of features in the SAXS profile of the P3HT-PEO/LiTFSI mixture.

The next step was the use of the polymer as binder material for the cathode in a LiFePO$_4$ battery. To make a cathode film, P3HT-PEO was dissolved in THF, along with LiTFSI (also with r=0.085). The LiFePO$_4$ active material was added to the solution (50% by weight) and homogenized (Polytron PT 2100) for approximately 5-10 minutes. The mixture was cast on aluminum foil, and doctor bladed to obtain a homogenous film. The film was dried overnight under vacuum at a temperature of 70° C. All steps were performed inside a glovebox under Ar atmosphere.

Figure 3:
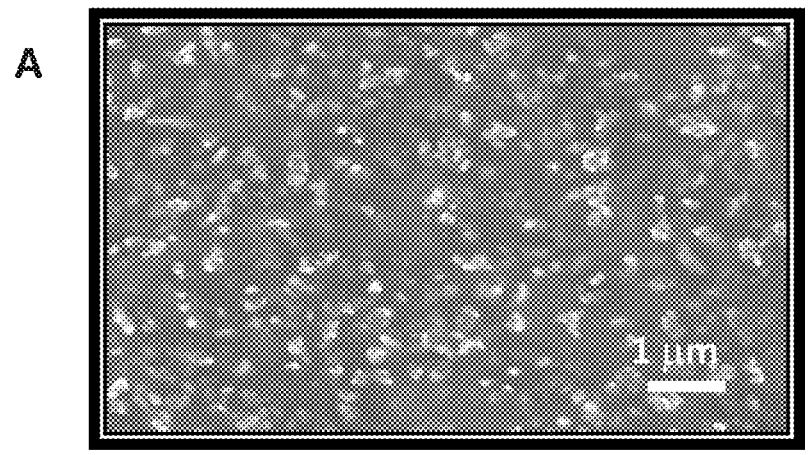
FIG. 3A is a SEM image of the cathode composed of P3HT-PEO, LiTFSI and $LiFePO_4$.
FIG. 3B includes the cathode reactions and a schematic of the battery cell according to one aspect of the invention.
Figure 3:
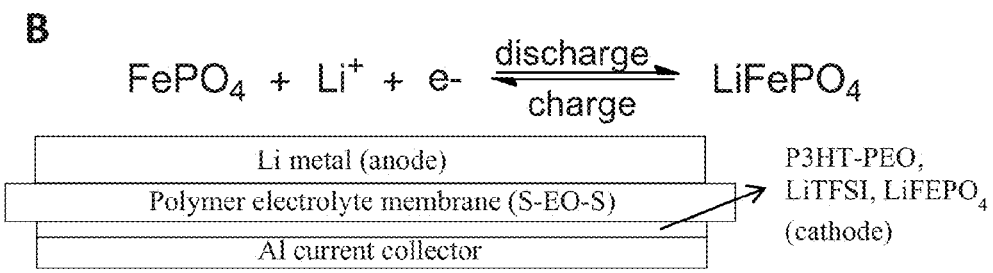

FIG. 3A shows a scanning electron microscopy (SEM) image of the cathode obtained from the LiFePO$_4$/P3HT-PEO/LiTFSI mixture. The LiFePO$_4$ particles appear as bright spots and the polymer/salt mixture appears as a dark matrix. This cathode is remarkably simple when compared with a traditional lithium-ion cathode which contains pores for ionic conduction, carbon for electronic conduction, and a polymeric binder to hold the structure in place in addition to the active material. In our battery a single polymer serves as the binder and the conductor of ions and electrons in our cathode.

Figure 4:
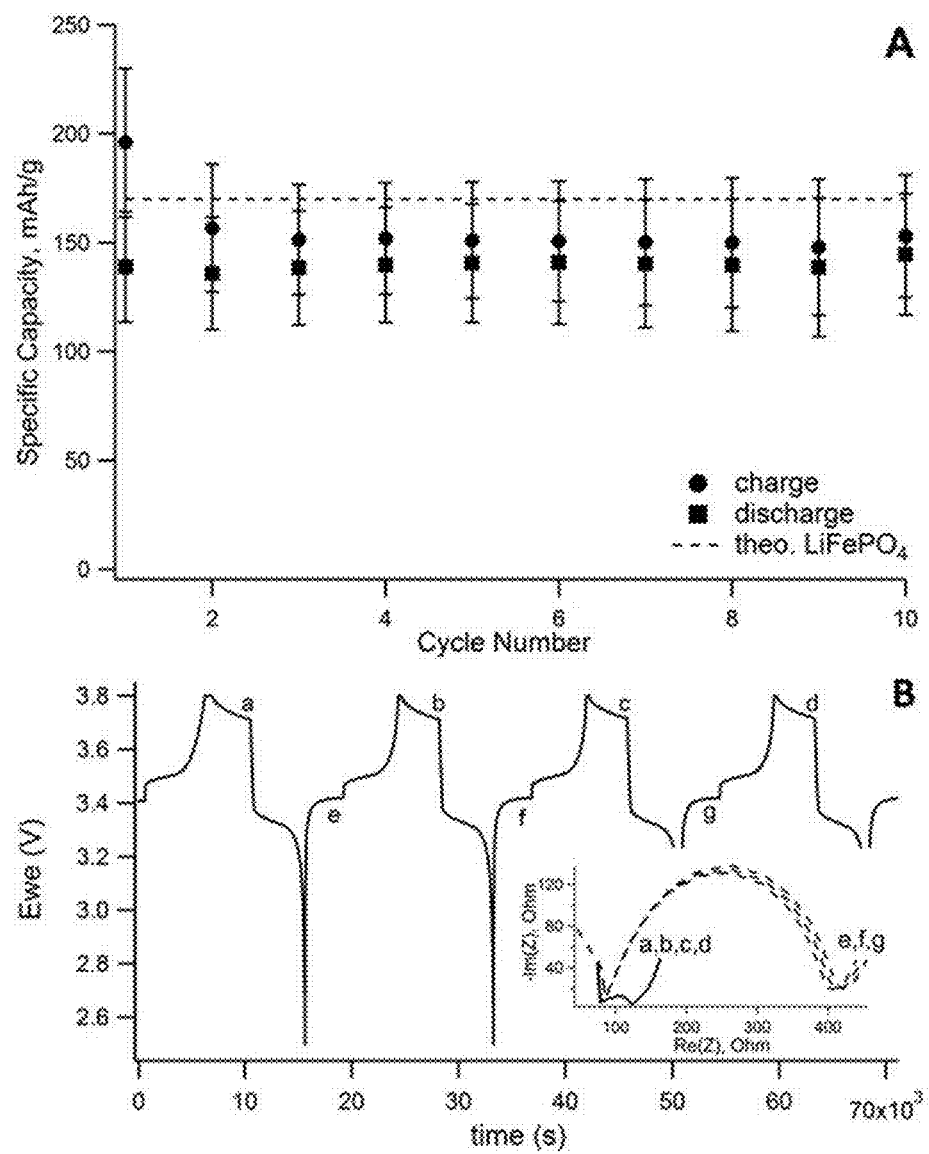
FIG. 4A is a plot of average specific capacity for 10 cells as a function of cycle number.
FIG. 4B) is a cycling plot (cell potential versus time) of a battery composed of a lithium anode, a solid electrolyte and a P3HT-PEO/$LiFePO_4$ cathode, (inset) Nyquist impedance plots taken at specified points after charging (a-d) and discharging (e-g) the battery.

A schematic of the cross-section and the cathode reactions are given in FIG. 3B. To assemble a cell, a 1 cm² area circular cathode was punched out of the cast film and pressed onto a 30-50 μm thick film made from a mixture of polystrene-b-poly(ethylene oxide)-b-polystyrene (SEOS) and LiTFSI (r=0.085) (refer to SI). The SEOS/LiTFSI film serves as the electrolyte for the battery (FIG. 3B). A piece of lithium was then pressed onto the other side of the membrane to complete the cell. The cells were then cycled from 3.8V to 2.5V, at a current density of 0.02 mA/cm². This current typically translates to a 4 h symmetric charge-discharge cycle with a 1 h rest step between each charge and discharge run. The average specific capacities of ten battery cells obtained during the first 10 cycles are shown in FIG. 4A, while typical charge and discharge cycles are shown in FIG. 4B. On average, the batteries show a specific capacity that approaches the theoretical value for $LiFePO_4$ (170 mAh/g) with relatively little capacity fade. It is evident that the P3HT-PEO copolymer delivers both ions and electronic charge to the active centers, and this allows the batteries to cycle efficiently.

In FIG. 4A) shown is average specific capacity for 10 cells as a function of cycle number. In FIG. 4B, shown is a cycling plot (cell potential versus time) of a battery composed. of a lithium anode, a solid electrolyte and a P3HT-PEO/$LiFePO_4$ cathode, (inset) Nyquist impedance plots taken at specified points after charging (ad) and discharging (e-g) the battery.

An important factor for the copolymers of the invention is that P3HT is a semiconductor, i.e. the conductivity of this material can be dramatically altered by oxidation. It is known that the conductivity of poly(3-alkylthiaphenes) increases by several orders of magnitude at potentials of about 3.2 V relative to $Li^+$/Li,(28) or by the addition of chemicals, such as tetrafluorotetracyanoquinodimethane (F4-TCNQ).(29) Results of cyclic voltametry experiments, shown in Figure S4 (see SI), confirm that this true for our P3HT-PEO copolymer, where the onset of oxidation occurs at ~3.1 V. It is thus clear that electrochemical doping of the P3HT block due to the applied potentials during the charge-discharge cycles enhances electronic transport over and above that obtained in the undoped state (FIG. 1).

In the inset to FIG. 4B, we show the impedance spectra of the entire battery taken during consecutive cycles—one set at the end of the charge cycle (a,b,c,d) and the other set at the end of the discharge cycle (e,f,g). The overall resistance of the cell changes by an order of magnitude from a fully-charged to fully-discharged state, and it changes reversibly from one cycle to the next. The possibility of changing the electronic resistance of the battery in situ offers unprecedented possibilities for controlling the battery. The handgap of the electronically conducting microphase can, in principle, be engineered to enable properties such as rapid charging and overcharge/overdischarge protection.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

REFERENCES

1. J. M. Tarascon, M. Armand, *Nature* 414, 359 (2001).
2. M. Armand, J. M. Tarascon, *Nature* 451, 652 (2008).
3. R. D. Rauh, K. M. Abraham, G. F. Pearson, J. K. Surprenant, S. B. Brummer, *J. Electrochem. Soc.* 126, 523 (1979).
4. K. M. Abraham, Z. Jiang, *J. Electrochem. Soc.* 143, 1 (1996).
5. P. G. Bruce, B. Scrosati, J. M. Tarascon, *Angew. Chem. Int. Ed.* 47, 2930 (2008).
6. G. Girishkumar, B. McCloskey, A. C. Luntz, S. Swanson, W. Wilcke, *J. Phys. Chem. Lett.* 1, 2193 (2010).
7. B. L. Ellis, K. T. Lee, L. F. Nazar, *Chem. Mater.* 22, 691 (2010).
8. D. Linden, T. B. Reddy, *Handbook of Batteries*. (McGraw-Hill, ed. 3rd; 2002).
9. N. Oriovskaya, N. Browning, Eds., *Mixed ionic electronic conducting per for advanced energy systems*, vol. 140 (Kluwer Academic Publishers, Kyiv, Ukraine, 2003), vol. 140.
10. M. M. Thackeray, J. Thomas, M. S. Whittingham, *Mater. Res. Bull* 39, (2000).
11. N. Costantini, G. Wegner, M. Mierzwa, T. Pakula, *Macromol. Chem. Phys.* 206, 1345 (2005).
12. D. Witker, M. D. Curtis, *J. Power Sources* 156, 525 (2006).
13. R. S. Loewe, S. M. Khersonsky, R. D. McCullough, *Adv. Mater.* 11, 250 (1999).
14. M. Jeffries-El, G. Sauve, R. D. McCullough, *Macromolecules* 38, 10346 (2005).
15. H. C. Kolb, M. G. Finn, K. B. Sharpless, *Angew. Chem. Int. Ed.* 40, 2004 (2001).
16. T. L. Benanti, A. Kalaydjian, D. Venkataraman, *Macromolecules* 41, 8312 (2008).
17. P. Paoprasert, J. W. Spalenka, D. L. Peterson, R. E. Ruther, R. J. Hamers et al., *J. Mater. Chem.* 20, 2651 (2010).
18. R. A. Huggins, *Ionics* 8, 300 (2002).
19. J. R. Maccallum, Vincent, C. A., *Polymer Electrolyte Reviews*, vol. 1 (Elsevier Applied Science Publishers Ltd., New York, 1987).
20. J. Jamnik, J. Maier, *J. Electrochem. Soc.* 146, 4183 (1999).
21. C. Deslouis, T. ElMoustafid, M. M. Musiani, B. Tribollet, *Electrochim. Acta* 41, 1343 (1996).
22. L. M. Burke, I. M. Khan, *Macromol. Chem. Phys.* 201, 2228 (2000).
23. J. Plocharski, H. Wycislik, *Solid State Ionics* 127, 337 (2000).
24. M. Singh, O. Odusanya, G. M. Names, H. B. Eitouni, E. D. Gomez et al., *Macromolecules* 40, 4578 (2007).
25. R. Zhang, B. Li, M. C. Iovu, M. Jeffries-EL, G. Sauve et al., *J. Am. Chem. Soc.* 128, 3480 (2006).
26. J. S. Liu, E. Sheina, T. Kowalewski, R. D. McCullough, *Angew. Chem. Int. Ed.* 41, 329 (2002).
27. N. S. Wanakule, A. Panday, S. A. Mullin, E. Gann, A. Hexemer et al., *Macromolecules* 42, 5642 (2009).
28. G. Chen, T. J. Richardson, *Electrochem. Solid St.* 7, A23 (2004).
29. K.-H. Yim, G. L. Whiting, C. E. Murphy, J. J. M. Hails, J. H. Burroughes et al., *Adv. Mater.* 20, 3319 (2008).
30. R. S. Loewe, P. C. Ewbank, J. S. Liu, L. Zhai, R. D. McCullough, *Macromolecules* 34, 4324 (2001).
31. N. Hadjichristidis, H. Iatrou, S. Pispas, M. Pitsikalis, *J. Polym. Sci. Pol. Chem.* 38, 3211 (2000).
32. R. P. Quirk, J. Kim, C. Kausch, M. S. Chun, *Polym. Int.* 39, 3 (1996).
33. A. Panday, S. Mullin, E. D. Gomez, N. Wanakule, V. L. Chen et al., *Macromolecules* 42, 4632 (2009).

We claim:
1. A block copolymer synthesized according to the process:
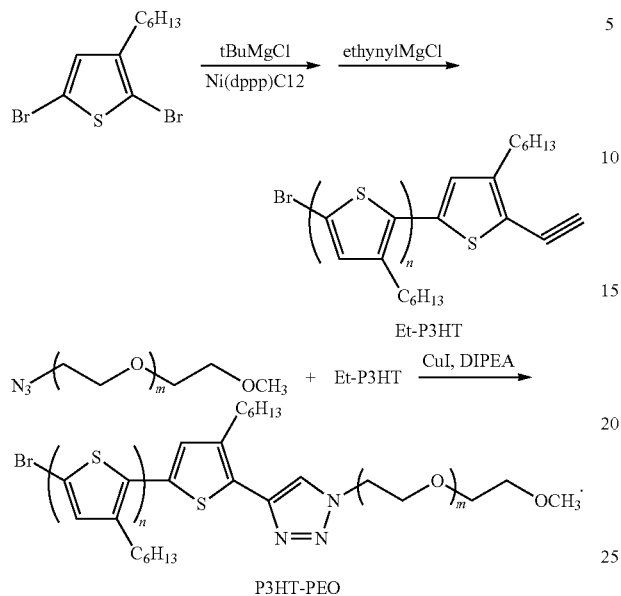
Et-P3HT
P3HT-PEO
2. A battery electrode including the block copolymer of claim 1.